March 17, 1931.                A. M. DONNELLY                1,796,984
                                 KELLY BUSHING
                                Filed Aug. 5, 1929
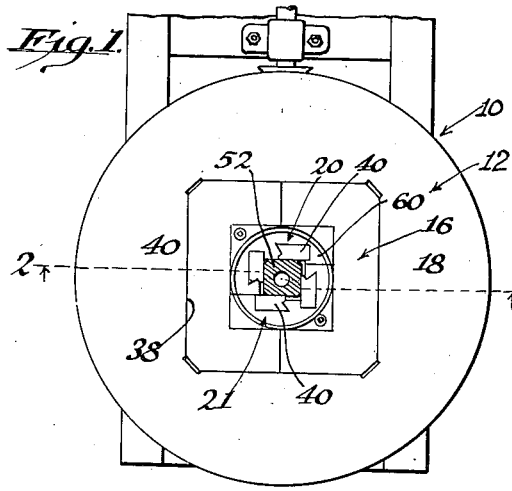
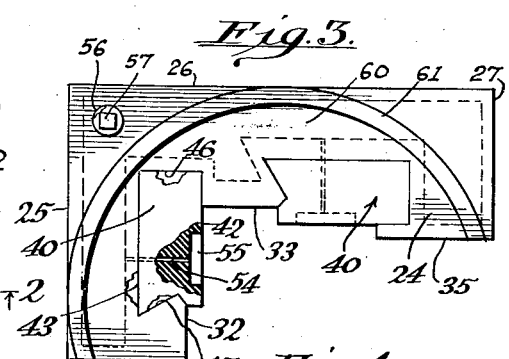
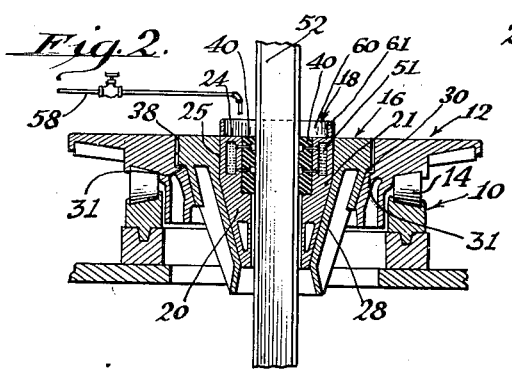
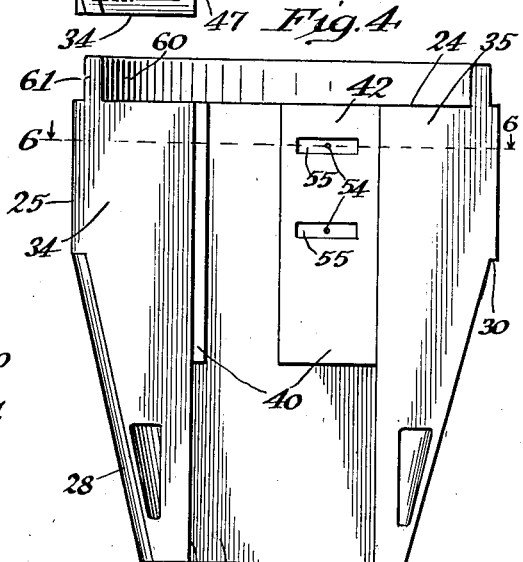
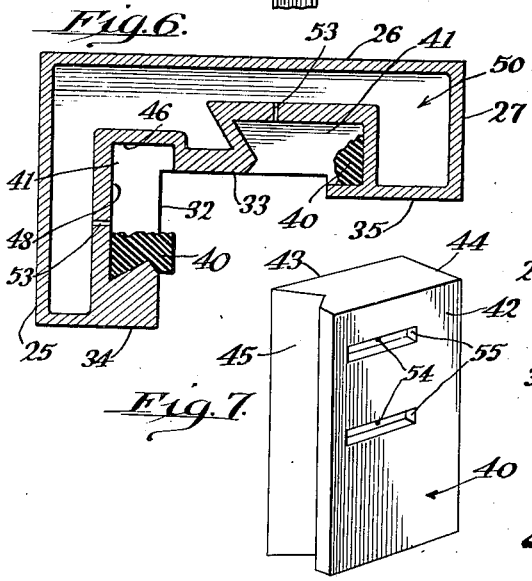
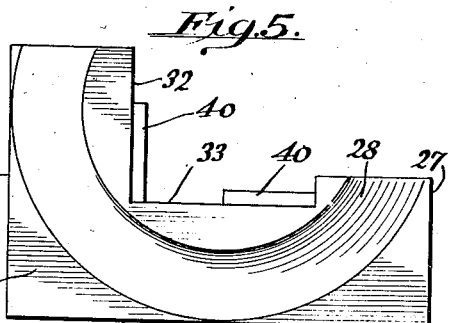
Inventor:
Alvin M. Donnelly.
Attorney.

Patented Mar. 17, 1931

1,796,984

UNITED STATES PATENT OFFICE

ALVIN M. DONNELLY, OF VENTURA, CALIFORNIA

KELLY BUSHING

Application filed August 5, 1929. Serial No. 383,582.

This invention relates generally to rotary well drilling, and more particularly to the bushings employed in connection with the rotary table through which the "Kelly" or drill stem slides during drilling operations.

Considerable difficulty has been experienced with the usual form of metal drive bushings now generally employed in rotary drilling, especially so when drilling through certain formations (commonly referred to as rough drilling) due to side walls of the "Kelly" frictionally engaging the surfaces of the metallic bushings resulting in vibration of the rotary table which often becomes so pronounced as to shake loose the anchor bolts and appreciably deteriorate the roller bearings of the table, also at times the "Kelly" will not slide through the bushing due to binding action between the surface of the "Kelly" and the bushing although lubricated in the usual manner.

The object of this invention is to provide an anti-friction "Kelly" bushing for rotary well drilling.

Another object of this invention is to provide a "Kelly" bushing provided with removable cushions adapted to act as shock absorbers between the "Kelly" and rotary table, and to prevent vibration during the operation of the table.

A further object of this invention is to provide a "Kelly" bushing provided with improved means for lubrication.

Other objects and advantages will be apparent from the following description, reference being had to the accompanying drawings illustrating a practical embodiment of the invention, in which:

Fig. 1 is a top plan view of a rotary table showing the drive bushing in place in the master bushing with the "Kelly" engaging the resilient cushions;

Fig. 2 is a vertical sectional view taken on line 2—2 of Fig. 1;

Fig. 3 is a top plan view of one of the complementary members of the bushing as it appears when removed from the rotary table;

Fig. 4 is a side elevation of a bushing member looking toward the interior thereof in the direction indicated by the arrow 2 of Fig. 1;

Fig. 5 is a bottom plan view of a bushing member taken in the direction indicated by arrow 5 of Fig. 4;

Fig. 6 is a horizontal section of a bushing member taken on line 6—6 of Fig. 3;

Fig. 7 is a perspective view of one of the anti-friction cushions removed from the bushing member.

Referring now more specifically to the drawings, 10 designates a rotary table of usual type consisting of a table member 12 mounted for rotation on bearings 14, and provided with the usual master bushing 16 adapted to receive the drive bushing 18 that constitutes the invention hereinafter described.

This drive bushing 18 is preferably formed of complementary members 20 and 21 of identical construction, which, when assembled in the master bushing 16 form the drive bushing as illustrated in Figs. 1 and 2 of the drawings.

Each bushing member preferably consists of a casting of polygonal form having a flat upper surface 24, straight outer walls 25, 26, and 27 disposed at right angles to each other that terminate in a lower semi-circular tapered wall 28, the junction of the side walls and tapered wall forming a shoulder 30 adapted to engage a seat 31 formed in the master bushing 16.

The inner walls 32, 33 of the bushing members are flat and disposed at right angles, and are further provided with parallel faces 34 and 35 which abut when the members are assembled in the master bushing. When thus assembled the walls 25, 26, and 27 engage corresponding walls of a recess 38 formed in the master bushing with the tapered walls extending into the opening provided for insertion of the usual slips (not shown), thereby holding the drive bushing 18 thus formed against rotation in the master bushing.

Cushions 40 formed of a resilient material such as rubber shown in detail in Fig. 7 comprising the essential principal feature of the present invention are adapted to be inserted into and rest in recesses 41 formed in the bushing members. Each cushion is of substantially rectangular form having flat side faces 42 and 43 with flat and irregular end faces 44 and 45 respectively, which engage corresponding surfaces 46, 47, and 48 formed by the recesses in the members of the drive bushing.

The upper portion of each bushing member is cored adjacent the recesses 41 to form an oil reservoir 50 for the reception of a lubricant 51 such as heavy oil, which is conveyed to the outer surfaces of the "Kelly" 52 through ports 53 formed in the bushing members. These ports register with similar ports 54 in the resilient cushions which terminate in depression 55 formed in the face 42 of said cushions, the lubricant being introduced into the reservoir through an opening 56 closed by a plug 57.

Under certain conditions it may be found desirable to lubricate the "Kelly" with the rotary mud from the settling pit, and this may be accomplished by means of a pipe line 58 from the circulating pumps adapted to discharge into a receptacle 60 formed by flanges 61 projecting from the upper surface 24 of the metallic members of the drive bushing.

From the foregoing it will be seen that during drilling operations the cushions will act as shock absorbers between the "Kelly" and the table, and also reduce vibration of the table to an appreciable extent. Further as the surfaces of the cushions are lubricated the "Kelly" will slide freely through the drive bushing without friction.

I claim:

1. A drive bushing for rotary drilling tables comprising a body member having an opening therethrough for the free passage of a drill "Kelly" while drilling, and cushioning members secured to the oppositely disposed walls of the opening of the body member.

2. A drive bushing comprising a metallic member having an opening therethrough, for the free passage of a drill "Kelly" while drilling, resilient members for lining the walls of said opening, and means to secure the resilient members to the walls of the opening in the metallic member.

3. A drive bushing for rotary well drilling tables comprising a pair of metallic members adapted to be secured together to form an opening therethrough for the free passage of the drilling "Kelly" while drilling, said members having recesses formed on their inner vertical faces, and a plurality of cushioning members formed of resilient material mounted in the recesses formed in said metallic members.

4. A drive bushing for rotary well drilling tables comprising complemental metallic members adapted to be placed together to form a central opening therethrough for the free passage of the drilling "Kelly" while drilling, and a plurality of resilient cushioning members secured to the walls of the central opening formed by the union of said metallic members.

5. A drive bushing for rotary well drilling tables comprising complemental metallic members each provided with a reservoir for the reception of a lubricant, said member adapted to be placed together to form a central opening for the passage of the drilling "Kelly" therethrough, each of the metallic members being provided with a lubricant port leading from the lubricant reservoir to its inner faces, and a plurality of resilient members secured to the inner faces of the metallic members, each of said resilient members having lubricant ports registering with the ports of the metallic members.

6. In combination with a rotary well drilling table provided with an opening therethrough for the passage of drilling tools and the like, of a plurality of resilient cushioning members for lining the walls of said opening, and means for securing the same in place.

7. A drive bushing for rotary well drilling tables comprising a pair of metallic members, each of said members having a plurality of recesses formed in their inner vertical faces, and cushions formed of resilient material mounted in the recesses formed in said metallic members, there being a lubricant reservoir formed in each of said metallic members, said metallic members and cushions being provided with registering ports for distributing lubricant from the reservoir to the outer surface of the cushions, whereby to lubricate the "Kelly" on an operation of the table.

8. A drive bushing for rotary drilling tables comprising a body member having an opening therethorugh for the free passage of a drill "Kelly", cushioning members secured to the walls of the opening of the body member, and means to lubricate the contacting surfaces of said cushioning members.

In testimony whereof I affix my signature.

ALVIN M. DONNELLY.